Patented Dec. 10, 1940

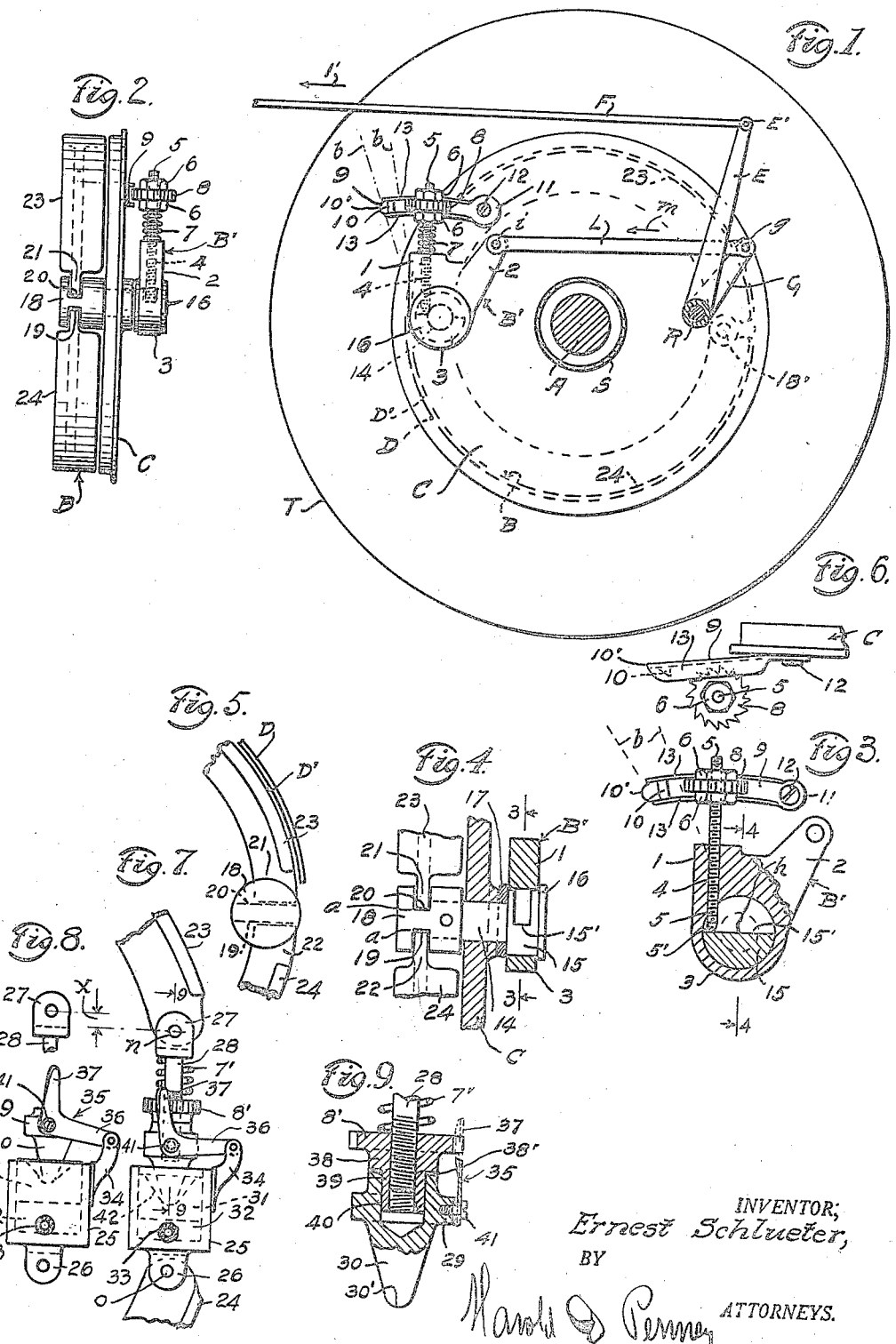

2,224,197

UNITED STATES PATENT OFFICE 2,224,197

SELF-ADJUSTING WHEEL BRAKE

Ernest Schlueter, Jamaica, N. Y.

Application March 17, 1939, Serial No. 262,385

4 Claims. (Cl. 188—79.5)

The present invention relates to an improvement in vehicle brakes, and has for its main object the provision of means whereby brake shoe wear may be automatically taken up, or adjusted, thus maintaining the brakes relatively constant in friction braking adjustment relative to the brake drums.

A further advantage is in the provision of means, whereby the brakes are sequentially adjusted for wear during the act of applying the brakes, during the use thereof.

In vehicle brakes, especially those used on automobiles, in particular, there are two forms of brake actuation, both being foot actuated, one type being mechanical the other type being fluid actuated. It is, therefore, amongst the features of advantage herein, to provide a brake adjusting means that may be used on either the mechanical or fluid controlled hydraulic type of brakes, the principal of operation and construction thereof being readily adaptable to either type.

The foregoing, and other features of advantage will be apprehended as the herein description proceeds, and it will be obvious that modifications may be made in the principle and structure herein disclosed without departing from the spirit hereof or the scope of the appended claims.

In the drawing,

Fig. 1 is a view in elevation, with parts sectioned, for convenience, showing the inside face of an automobile brake;

Fig. 2 is an external side view of the brake;

Fig. 3 is a partially sectioned, slightly enlarged front view of the brake adjusting means;

Fig. 4 is an enlarged, partially sectioned and fragmented side view of the brake adjusting means;

Fig. 5 is an enlarged, fragmented side view of the annular brake shoes of Fig. 4;

Fig. 6 is a plan view of a part of Fig. 3;

Fig. 7 is a fragmentary side view of a hydraulic or fluid actuated brake means having a brake tension adjusting means thereon;

Fig. 8 is a view similar to Fig. 7, with parts removed; and

Fig. 9 is an enlarged view of the pivot adjusting end of the fluid brake operating means.

In Fig. 1, the vehicle wheel is shown as T, upon which the brake and its wear adjusting devices are mounted. The semi-annular brake shoes 23—24 are both independently mounted for oscillation upon a trunnion 18', Fig. 1, said trunnion, in turn being fixedly mounted, as in the usual construction, upon a part of the brake dust flange or housing C, which in turn may be fixedly mounted upon a part of the unsprung frame portion of the vehicle wheel axle assembly. This part of the brake structure and mounting is of known practice and construction.

The ends of the semi-annular brake flange members 23—24 opposite to the pivot or trunnion 18', and as shown in Figs. 4 and 5, are provided with thinned, flat ended tongue extensions 21—22, the ends 19 and 20 of said extensions being located in spaced apart, parallel relation to one another, as shown in Fig. 5.

The flat and parallel ends of said tongues 19 and 20 are each seated in the opposite kerfs a—a of rotatable fulcrum member or braking cam 18, Fig. 4, and thereby traverse the adjacent end of the rotatably mounted braking cam 18, which is pinned or otherwise fixed to a shaft 14, Fig. 4, which shaft is rotatably mounted in the brake dust flange C.

The opposite end of shaft 14 mounts a washer 17, and a shouldered, cylindrical cam head 15, which is provided with a traversing kerf across its mid-section to provide a second fulcrum or wear adjusting cam seat 15', Figs. 3 and 4. The seat 15' may be, and preferably is parallel to the seats a—a of braking cam 18.

A two-armed lever, generally denoted by B', Figs. 1, 2, 3 and 4, is vibrationally mounted by a hub 3 upon the flanged brake adjusting cam head 15, and is held in operative position by and between the washer 17 and the flanged or shouldered end 16, so that said arm B' is operatively held for relative rotative movement upon said cam head 15 and is parallel to the face of the dust or brake protecting flange C, Figs. 1, 2 and 4.

An integral angular operative arm 2 on lever B', connected to hub 3, is pivotally connected to a connecting drag link L by a pivot i, said link L being in turn pivotally connected to a link arm G, by a pivot g, Fig. 1, said link arm G being suitably fixed or keyed to a pivot R, which is, in turn, rotatably mounted in flange C by means not shown.

The other, integral arm 1, of the two armed lever B' is in the form of an elongate, relatively upright boss 1, and is provided with a threaded bore 4 in which is threadedly and rotatably engaged a threaded brake wear cam adjusting stem 5. The arm 1 may be integral with the hub 3 of the lever B'. The upper end of the stem 5 externally extends a suitable distance from the top end of boss 1, as shown in Figs. 1, 2 and 3, and has mounted thereon a toothed ratchet wheel 8, the angle of the ratchet teeth of which are inclined in an anti-clockwise direction, as viewed in Fig. 6, and when operating, cause the said wheel 8 to operate, automatically, by an intercepting ratchet tooth 10, in a clockwise direction, as viewed in Fig. 6. The wheel 8 is centrally threaded and is held in desired operative position on the threaded stem 5 by upper and lower threaded lock nuts 6—6, Figs. 1, 2 and 3, which may be adjusted from time to time, to elevate or raise the wheel 8 on the stem 5, relative to the pawl bar 9, as needs and wear require.

The lower end of stem 5 is developed into a cone shaped or rounded end 5', which at all times rests upon and is in offset contact with the seat 15' of the cam lever 15, Fig. 3, the normal contact of which, in non-operative position therewith, leaves the two semi-annular brake members 23—24 free of the inside face of the brake flange D, shown dotted at D' in Fig. 5 so that in the positions shown in Figs. 1, 2 and 3, the brake shoes 23—24 are non-braking and clear of the interior face of the brake flange or drum D, this clearance being shown at D', Figs. 1 and 5.

As described, the ratchet wheel 8, is so arranged as to swing in a short, reciprocal arc, based upon the center axis $h$ of the cam or fulcrum assembly of the rotative members 18, 14 and 15. This arc is indicated at $b$, in Fig. 3, by the curved arc of the ratchet wheel actuating pawl bar member 9, Figs. 1, 2, 3 and 6, but especially in Figs. 1 and 3 at $b$—$b$ and $h$.

This toothed wheel actuating pawl bar member 9, may be a pivoted bar 9, more or less resilient or springy at its outer end 10' and may be held in operative position by a single pivotal screw 12, Figs. 1, 3 and 6, which holds the curved pawl bar 9 to the face of the dust flange C, Figs. 1 and 6.

The pawl bar 9, as previously noted, is arc shaped, may have an eyelet end 11, to receive pivoting screw 12, is provided with two opposite ratchet wheel tracking flanges 13—13 which constrain and guide the adjusting ratchet movement of ratchet wheel 8, there being an outstanding ratchet wheel operating tooth 10, near the outer extremity of the pawl bar 9, Figs. 1, 3 and 6, which is located between the ratchet wheel guiding flanges 13—13.

The resilient pawl bar 9, as is illustrated in Fig. 6, is located at a slight angle outwardly from its mounting and its fastening means 12, and is thus resiliently influenced and stressed at its free end 10', against the toothed face of the traveling ratchet wheel 8, as it reciprocably traverses the length thereof, during the to and fro operation of the brake pedal to which the arm 2 of lever B' is attached, through rod L.

The pedal control, pedal not shown, but of usual construction, is connected to one end of the drag rod F, Fig. 1, the outer end thereof being connected to the usual spring return controlled pedal of usual construction, the opposite end being pivotally connected to a lever arm E by pivot E', said lever arm being fixedly connected to the operate lever arm G, upon brake pedal operation.

In the operation of operating to brake the vehicle of the foregoing described automatically adjusting brake operation, the pedal connected to drag rod F, pulls the connected lever structure E—G in the direction of arrow l', Fig. 1. This, in turn, causes the rod L to move in the direction of the arrow $m$, Fig. 1, and this action in turn pushes the lever B' towards the left, as viewed in Fig. 1. This action causes the ratchet wheel 8 to move towards the fixed ratchet tooth 10 on pawl bar or arm 9, and in the concurrent act of expanding the brake bands 23—24, by reason of the recessional left hand movement of the lever B', and through pressure of the stem 5 on the cam face 15' of cam 15 this causes the opposite expansion action on the brake bands 23—24, by the limited radial rotation of cam 18, which causes the brake bands 23—24 to expand and brake the drum D and simultaneously causes a recessional action of the cam face 15' on cam 15, and thus causes the ratchet wheel 8, to fail to reach the ratchet tooth 10, if no adjustment of the brakes are needed, or if the need of adjustment of stem 5 is indicated by a looseness, by reason of brake band wear, the tooth 10 engages the ratchet wheel 8 and causes it to rotate stem 5, clockwise, as viewed in Fig. 6, in the threaded bore 4, and this action moves the stem 5 slightly downwardly in lever B', as viewed in Fig. 3. If, during the braking action, due to the resilient mounting of the ratchet member 9, there is no wear to take up, the spring ratchet arm 9, is sprung out of the path of ratchet wheel 8, and no rotative adjustment of stem 5 for wear is made, because the stem 5 cannot be adjusted, and being resistant to rotation, the tooth 10 is sprung away from the ratchet wheel 8 and the wheel passes on to its full braking stroke without causing an adjusting rotation of the braking cam 18 by the stem 5.

As will be seen in Figs. 1 and 2, a coiled compression spring 7 is located between the under portion of the ratchet wheel 10 and the top face of the arm 1 on the lever B', whereby the ratchet wheel and its stem 5 are held against inadvertent rotation, and at the same time may be rotated during adjusting action, and held as adjusted from time to time.

In the foregoing described action, it will thus be seen that the stem 5, due to the braking action of the mechanism above disclosed, constantly finds, during braking movement, and corrects, automatically, any wear looseness between the brake bands and the brake drum, to any desired increment of adjustment necessary, and that as wear and braking action occur, the ratchet wheel follows up and corrects the necessary wear play between the coacting brake parts.

The operation of the foregoing described device is as follows; if there is no wear on the brake bands, as when new, the device stands as shown in Figs. 1, 2 and 3. Operation of the brake pedal causes lever B' to move to the left as viewed in Figs. 1 and 3. This action causes the stem 5 to rotate to the cam shaft 15 to rock to the left by reason of the pressure of stem 5 on the cam face 15', Fig. 3, and this in turn rocks the cam shaft 14 and causes the faces 19 and 20 of brake cam 18 to exert an expanding pressure on the ends 21—22 of the brake bands 23—24. When wear between the braking surfaces occurs so that the ratchet wheel passes the pawl tooth 10, then a tooth on the wheel 8 is intercepted by the tooth 10, and the stem 5 is fed downwardly enough of an increment to rotate cam bar 15 to the left, as viewed in Fig. 3, and thus hold the cam bar 15 and its associate cam 18, and the brake bands in the newly adjusted wear take up positions. As wear occurs the stem 5 is automatically fed down on cam face 15', until finally the ratchet wheel 8 gets so low in relative operating position with pawl tooth 10, that it must be raised on stem 5, by loosening the lock nuts 6—6 and screwing the ratchet wheel 8 back to its operative position with pawl tooth 10, and then locking the wheel and its nuts in the adjusted position.

After a considerable period of automatic adjustment, as previously described, the lock nuts 6—6 may be loosened and the ratchet wheel may be reset, after setting the stem 5 downwardly, as viewed in Fig. 3, thus to elongate the threaded stem 5, downwardly to follow up the gradual brake band wear, when such wear gets beyond the capacity of the original adjustment of the device from the previous setting. This arrangement obviates the necessity of many minor adjustments, between periods of normal wear adjustment, now necessary in present standard brake structures.

Thus the necessity of many individual, manual brake adjustments between major brake wear adjustments is automatically obviated, and the time between manual periods of brake wear adjustment is extended.

A modified form of the present automatic adjustment for brake wear take-up is disclosed in Figs. 7, 8 and 9, wherein there is shown a modified form of detailed structure, and wherein the structure is designed to adapt the principles of the above described automatic brake adjustment and control to operate under the influence of a hydraulic brake operated means.

To this latter end, the brake bands 23—24, Fig. 7, are constructed as described for Figs. 1, 2 and 5, except that the operative ends of said bands are provided with pivoted yoke connections 26 and 27 respectively which, in turn are connected to the brake ends 23 and 24 by pivots n and o respectively, Fig. 7. Yoke 26 is integral with the bottom of a hydraulic piston cylinder 25, near the bottom of which, as disclosed in Figs. 7 and 8 is located the inlet port or duct 33, wherein a fluid, under pressure is admitted thereto from a brake pedal controlled source of hydraulicly actuated pressure, in the usual, customary structure, not shown, but well understood in this art.

Within the cylinder 25 is located a piston 31, said piston being interiorly provided with a cone shaped seat 42 at its outer end, Figs. 7 and 8. There is, normally a clearance 32, between the piston head and the cylinder head for the maintenance of a small quantity of either air or liquid therein, preferably the latter. On one side of the cylinder 25 is located a bracket or arm 34 which pivotally mounts an L-shaped bell crank at one end 36, said crank being also pivoted at 41, between its arms 36 and 37, to the shoulder 29 of a cone ended brake adjusting bearing member 30, Figs. 7, 8 and 9.

The bearing member 30 has a rounded coned end 30' which operatively rests in the seat 24 in the piston 31, and thus becomes a universal joint connection between the piston 31 and the structure mounted upon member 30.

The structure mounted upon member 30 comprises a rotatable bushing 38, Fig. 9, which is flanged on its upper end, the outer rim of said flange having ratchet teeth 8' thereon. The lower end of said bushing has a reduced cylindrical end 39, which rotatably fits into a bore 40 which is centrally located in bearing member 30. As thus constructed the bushing 38 rests by its shoulder 38' upon the upper face of bearing member 30.

The bushing 38 threadedly mounts a threaded push rod 28, on the opposite end of which is fixedly mounted the yoke 27, this yoke, in turn, being pivotally mounted to the lower end of the brake band 23 by a pivot pin n.

The L-shaped bell crank 35 has the upper end of its arm 37 slightly twisted, Figs. 7, 8 and 9 so as to have one of its side edges formed in a ratchet tooth engaging contour and thus to be engageable with the ratchet teeth 8' on bushing 38. A coiled compression spring 7' is mounted on the push rod 28 and is compressively mounted, Fig. 7, between the lower face of yoke 27 and the exposed face of the bushing 38. The function of this spring is the same as described for the spring 7 of Figs. 1 and 2.

In the operation of automatic brake wear adjustment of the device shown in Figs. 7, 8 and 9, when fluid pressure is introduced into the cylinder 25 through duct 33, the piston 31, being normally in the non-braking position shown in Fig. 7, then rises to the position shown in Fig. 8, the distance of rise between the operative and non-operative positions of the piston movement being shown at X, Fig. 8. This movement naturally expands the brake shoes 23 and 24 and creates a braking effect.

As the piston and its appurtenant operative means move from non-braking to braking position, the rise and fall of the movable elements causes the bell arm L to oscillate on its pivot 41, due to its pivoted connection to the bracket arm 34, and the relative movement between the piston 31 and the cylinder 25. This action thus causes the L-shaped arm, to move its pawl finger 37 to and fro past the perimeter of the toothed flange 8', from the position shown in Fig. 7, to the position shown in Fig. 8. This oscillating movement past the ratchet toothed rim of bushing 38, gives an intermittent tendency, when brake wear is present, to rotate the bushing 38. This action, by reason of the threaded connection between the bushing 38 and the non-rotatable push rod 28 intermittently and gradually moves the rod 28 upwardly and thereby operatively expands the two brake shoes 23—24 apart for wear adjustment.

The arm 36 may be made of flat spring metal and can play between the pitch of adjacent teeth of the toothed ratchet flange 8', when wear adjustment is not required, but like the intermittent feed as described for Figs. 1 to 6 inclusive, the fluid actuated device of Figs. 7, 8 and 9 moves a greater distance if there is excessive wear, and causes the finger 37 to move enough to adjust the flange 8' and thus constantly monitors the braking means, and thus the complete braking system, from foot pedal to brakes is kept in operative condition.

Having thus described the invention, what is claimed is:

1. In combination, semi-circular brake shoes adapted to be pivotally connected at one end and to be mounted in the frame drum of a brake; the free ends of the shoes being provided, in the plane of the shoes, with thin flat extensions each having side faces substantially parallel to the plane of the shoes; means engaging both side faces of said extensions and adapted to push the extensions apart for applying the shoes to the drum; said means including an active member and a motive member; means for operatively connecting said members comprising interengaged threaded male and female parts, one of said parts carrying a ratchet wheel fast thereon and adapted to be moved within limits by the brake-applying action; a helical spring carried around the male part and compressed between said wheel and the part not carrying the wheel fast thereon; and a resilient bar suitably supported at one end and having at the outer end a tooth adapted to catch one of the ratchet teeth when the members relatively move abnormally far in brake-applying direction, thereby to rotate the wheel an increment; the threads of said threaded part and the teeth of the wheel being so related that said increment tends to move the shoes toward the drum.

2. In combination, a frame drum; brake shoes therein; a shaft having a head having a transverse kerf forming a chordal seat; means operated by the shaft for applying the shoes; a two-arm lever having a hub vibrationally mounted on said head and provided with a short arm having therein a threaded bore substantially perpendicular to one end of said seat; a threaded stem engaged in said bore against said seat and projecting from the arm; means engaging the other arm to rotate said lever to press said stem against said end to rotate said shaft to apply said shoes; a ratchet wheel fast on the projecting portion of the stem; a spring compressed between said wheel and short arm; a fixed support; a resilient bar fast on said support and having at the other end a tooth adapted to catch one of the ratchet teeth when the lever moves abnormally far in brake applying direction, thereby to rotate the wheel an increment on restoration movement of the lever; the threads of the stem and the teeth of the wheel being so related that said increment moves the stem and the seat therewith, thereby to move the shoes an increment toward the drum.

3. In combination, a pair of brake shoes; a fixed bearing; a shaft intermediately received in the bearing; a cam fast on said shaft and having, on opposite sides, transverse kerfs having parallel bottoms respectively engaged between end faces of said shoes; a cylindrical head fast on the shaft the shaft and head being provided with a kerf forming a chordal seat; a lever having a hub vibrationally mounted on said head and having therein a threaded bore substantially perpendicular to one end of said seat; a threaded stem engaged in said bore and against said seat; means to vibrate said lever to press said stem against said end to rotate said bottoms to apply said shoes; a ratchet wheel fast on said stem; a spring compressed between said wheel and lever; a fixed support; a resilient tooth on said support adapted to engage and move the ratchet wheel an increment when the lever moves abnormally far; the threads of the stem and the teeth of the wheel being so related that said increment moves the stem and the seat therewith.

4. In combination, a frame drum; semi-circular brake shoes in the drum pivotally connected at one end and having, at the free ends, flat extensions; a cylinder having a closed end provided with spaced ears between which one of said extensions pivotally engages; a threaded push rod having at one end a yoke having spaced ears between which the other extension is pivotally engaged; a threaded bushing received on said push rod and provided with a rounded coned end in the cylinder and a ratchet wheel fast on a projecting portion of the bushing exterior to the piston; a piston in the cylinder having in its outer face a rounded seat receiving said rounded end; a helical spring on said rod compressed between said wheel and yoke; an L-shaped lever pivoted at its elbow part on an intermediate part of the bushing and having one arm fulcrumed on the open end of the cylinder; the other arm constituting a resilient bar having at the outer end a tooth adapted to catch one of the ratchet teeth when the piston moves abnormally far in brake applying direction, thereby to rotate the wheel an increment; the threads of the stem and the teeth of the well being so related that said increment moves the bushing toward said seat, thereby to move the shoes an increment toward the drum.

ERNEST SCHLUETER.